Jan. 29, 1963   M. A. ORDORICA ETAL   3,075,600
INDEPENDENT DRIVING STEERING WHEEL SUSPENSION MECHANISM
Filed Oct. 6, 1959   4 Sheets-Sheet 4

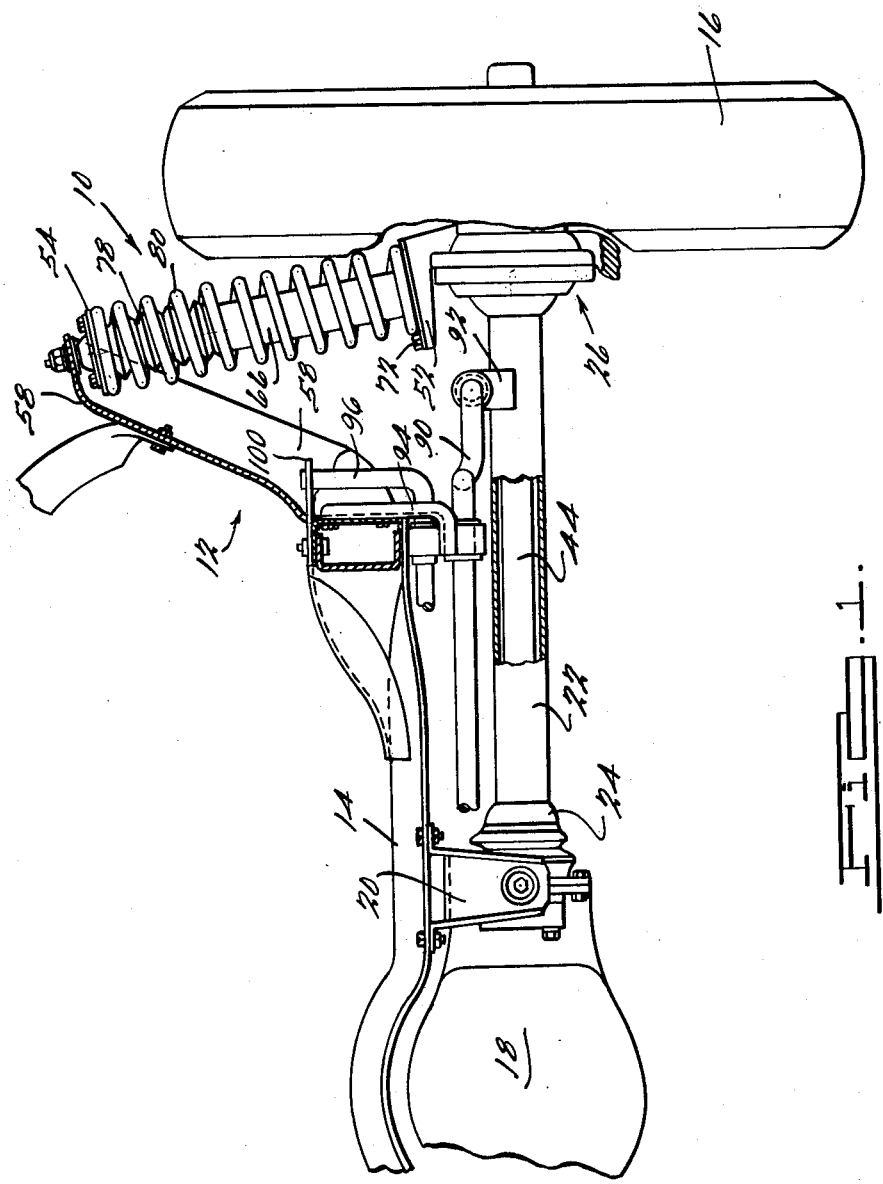

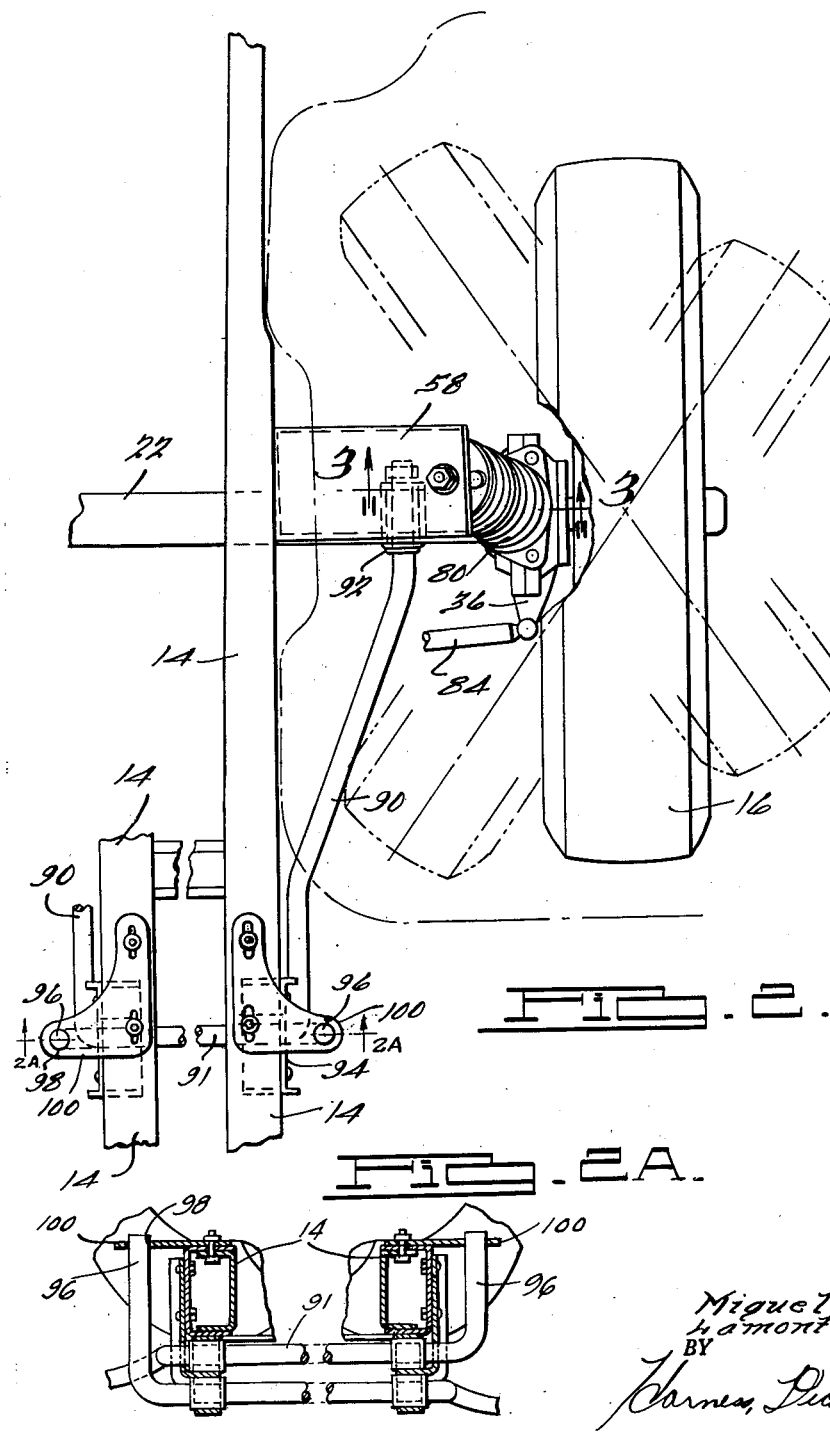

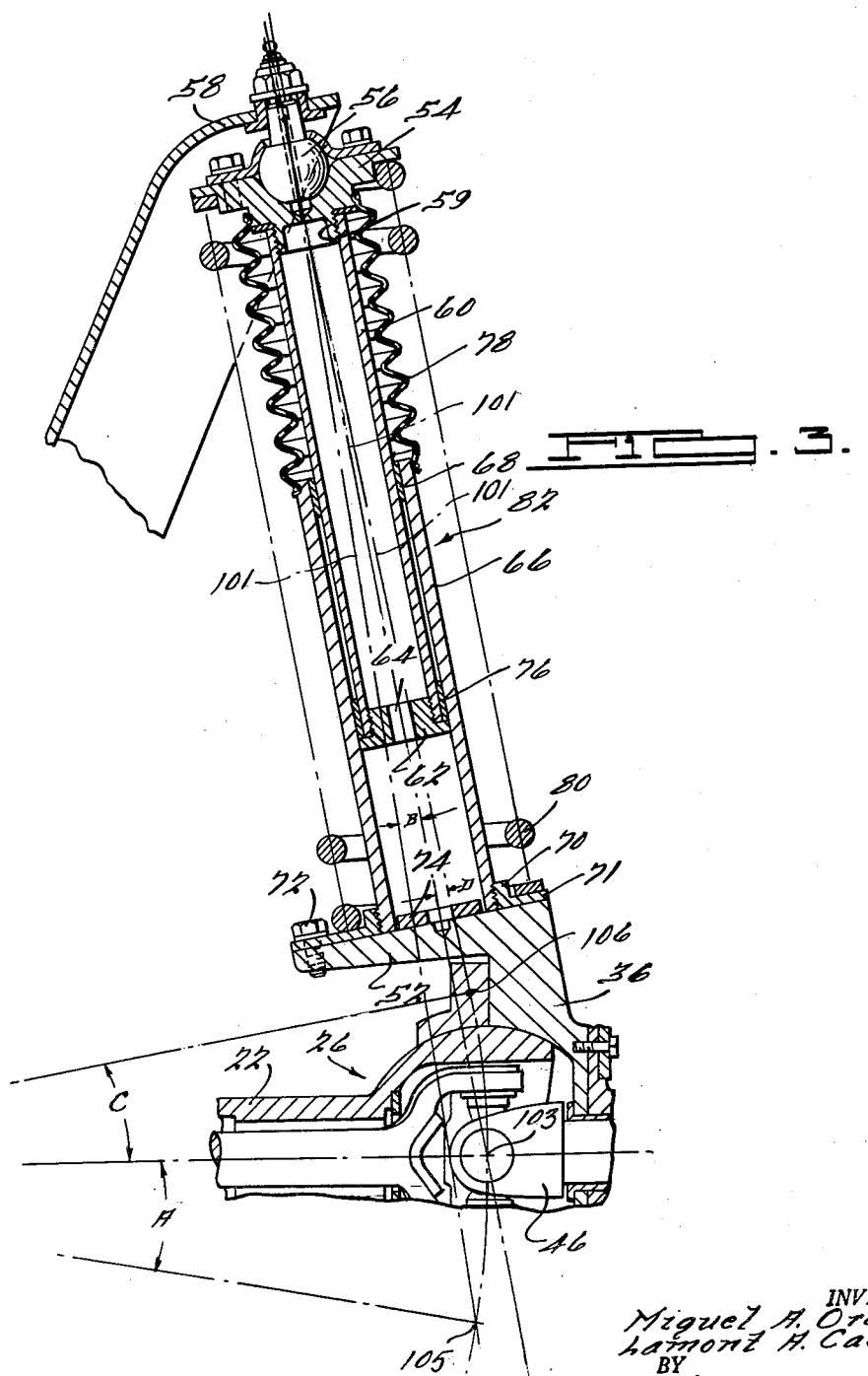

INVENTORS.
Miguel A. Ordorica.
Lamont H. Cadmus.
BY
Harness, Dickey & Pierce
ATTORNEYS.

United States Patent Office 3,075,600
Patented Jan. 29, 1963

3,075,600
INDEPENDENT DRIVING STEERING WHEEL SUSPENSION MECHANISM
Miguel A. Ordorica, Lambertville, Mich., and Lamont A. Cadmus, Toledo, Ohio, assignors to Willys Motors, Inc., a corporation of Pennsylvania
Filed Oct. 6, 1959, Ser. No. 844,708
7 Claims. (Cl. 180—43)

This invention relates generally to automotive vehicles and more particularly to an independent wheel suspension mechanism for an automotive vehicle.

The independent wheel suspension mechanism of this invention provides for an elastic support of the vehicle frame on the road wheels without the intermediary of rigid axles. When a pair of wheels are mounted on a rigid axle, and one of them passes over a road obstacle, the axle executes a small angular movement in the vertical plane and both of the wheels simultaneously perform angular movements of exactly the same magnitude. With independent suspension, the movements of the two wheels are not thus interdependent.

It is an object of this invention, therefore, to provide an independent suspension mechanism which provides the desired stable support of the vehicle frame on the road wheels and is simple and economical to manufacture and install.

A further object of this invention is to provide an independent suspension mechanism which includes a combination kingpin and shock absorber assembly that is attached to the wheel.

Another object of this invention is to provide an independent suspension mechanism for an automotive vehicle which can be applied to driven and steerable wheels.

Further objects, features and advantages of this invention will become apparent from a consideration of the following description, the appended claims, and the accompanying drawing, in which:

FIGURE 1 is a fragmentary front view of a portion of a vehicle provided with the independent suspension mechanism of this invention;

FIGURE 2 is a plan view of a portion of a vehicle provided with the independent suspension mechanism of this invention;

FIGURE 2A is a sectional view taken substantially along the line 2A—2A of FIGURE 2;

FIGURE 5 is a plan view showing a pair of wheels provided with the independent suspension mechanism of this invention and connected by means of an anti-sway bar.

Figure 3:
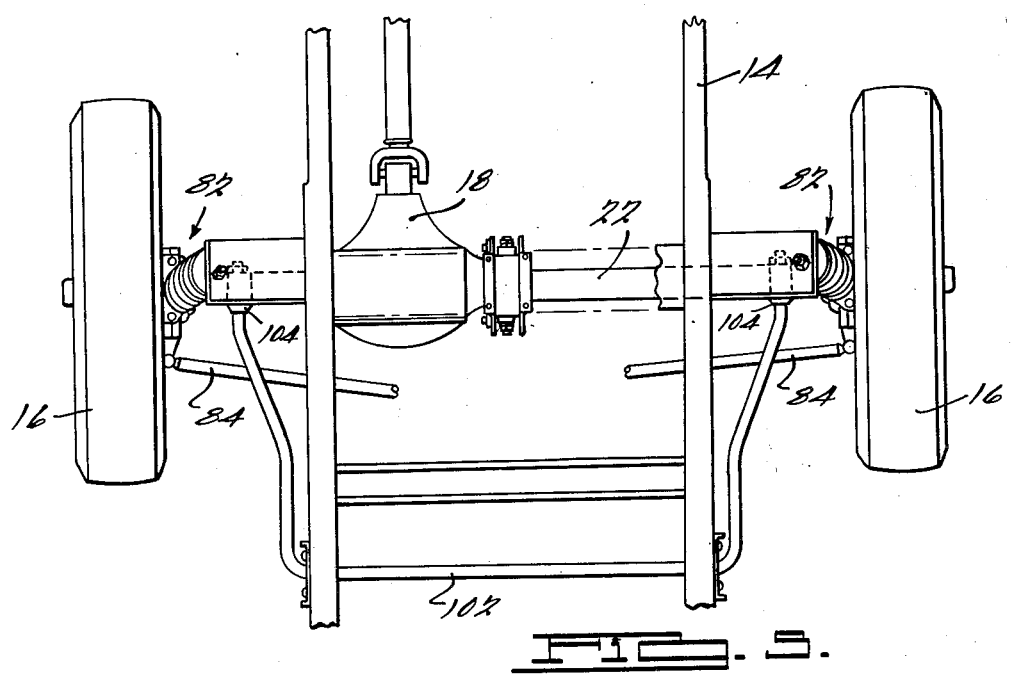
FIGURE 3 is an enlarged vertical sectional view looking substantially along the line 3—3 in FIG. 2.

With reference to the drawing, the wheel suspension mechanism of this invention, indicated generally at 10, is illustrated in FIG. 1 in a vehicle chassis 12 which includes a main frame 14 supported on a plurality of wheels 16, only one of which is shown. The chassis 12 includes a differential housing 18 which is supported on a pair of depending brackets 20, only one of which is shown, carried by the frame 14. An elongated shaft housing 22 extends transversely of the frame 14 and is mounted at its inner end, by means of a ball and socket joint 24, on the housing 18. At its opposite end, the shaft housing 22 is connected by means of a ball and socket joint 26 to the spindle 28 which rotatably supports the wheel 16.

The ball and socket joint 26 is formed by shaping the end 30 of the tubular housing 22 so that it is of a partial ball shape. Disposed about the ball-shape housing end 30 is a socket which consists of a pair of socket members 32 and 34 which extend about the end 30 and are secured together so as to form a fluid-tight ball and socket joint 26. A steering knuckle 36, which is formed as an integral part of the socket member 34, supports the spindle 28. Bolts 38 extend through a brake backing plate 40, a flange 42 on the spindle 28, and into the socket member 34 for mounting the backing plate 40 and the spindle 28 on the steering knuckle 36.

Figure 4:
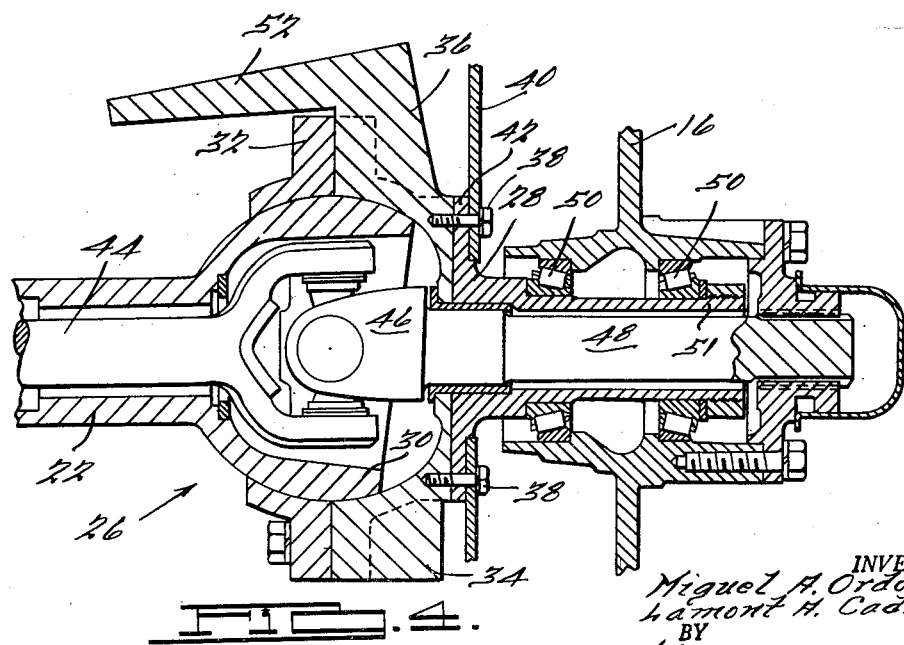
FIGURE 4 is a fragmentary sectional view showing the assembly of the independent suspension mechanism of this invention with the drive structure for the wheel.

The wheel 16 is driven by an elongated drive shaft 44 which is enclosed within the tubular housing 22 and is connected at its inner end by a universal joint, disposed within the joint 24, to the differential drive structure within the housing 18. At its opposite end, the drive shaft 44 is connected by a universal joint 46 to a stub shaft 48 which is rotatably supported in the spindle 28 and is connected at its outer end to the wheel 16. Spaced bearings 50 rotatably support the wheel 16 on the spindle 28 so that when the drive shaft 44 is rotated, the wheel 16 is rotated about a tubular portion 51 of the spindle 28 (FIG. 4).

The knuckle 36 has an inclined plate portion 52 disposed above the ball and socket joint 26 and a plate member 54 (FIG. 3) is mounted by means of a ball joint 56 on the upper end of an upwardly and outwardly inclined frame member 58 which constitutes a part of the main frame 12. The plate member 54 has a downwardly extending reduced diameter extension 59 which is threaded into the upper end of a tubular plunger member 60. A head 62 which has an axially disposed opening 64 is threaded into the lower end of the tubular plunger member 60.

A tubular cylinder member 66, which is telescoped onto the lower end of the plunger 60, carries a bearing and stop member 68 at its upper end which guidably supports the plunger 60 and at its lower end is threaded into a sleeve 70 on a flat plate 71 which is secured, as by bolts 72, to the plate portion 52 of the knuckle 36. The tubular plunger 60 telescopes within the cylinder 66 to a limit position in one direction in which the plunger head 62 engages a stop disk 74 secured to the top side of the knuckle plate portion 52 and in the other direction to a stop position in which a bearing sleeve 76 mounted on the plunger 60 at a position adjacent the head 62, engages the bearing stop 68 at the upper end of the cylinder 66. A flexible accordion-type boot 78 is secured to and extends between the plate member 54 and the upper end of the cylinder 66 for keeping dirt and the like out of contact with the plunger 60. A coiled compression spring 80 is positioned around the plunger 60 and cylinder 66, which constitute a telescoping plunger and cylinder assembly 82, and extends between the plates 52 and 54 for urging them in directions away from each other.

It can thus be seen that a portion of the frame 14 is supported on the upper end of the assembly 82 which is in turn carried by the wheel spindle 28. Consequently, during movement of the frame 14 over the ground surface, when the wheel 16 travels over ground irregularities causing it to move upwardly, the spring 80 is compressed to resist and limit the upward movement of the wheel 16. The cylinder 66 is approximately half filled with a fluid such as oil some of which is forced upwardly in the cylinder through the opening 64 in the plunger head 62 during compression of the spring 80 to thereby exert a dampening action on the spring 80. After the wheel 16 has passed over the irregularity, the spring 80 expands and this expansion is also dampened by the plunger and cylinder assembly 82.

During steering of the wheel 16, the knuckle 36 is moved, by means such as the steering link 84 shown in FIG. 2, which is pivotally connected at one end to the knuckle 36, so that the spindle 28 is rotated about the ball and socket joint 26, and during such movement the plate member 54 may pivot about the ball 56. To assist the spring 80 and the plunger and cylinder assembly 82 in dampening movement of the wheel 16, a torsion bar 90 may be secured at one end to a bracket 92 rigidly attached to the shaft housing 22. The bar 90 extends forwardly from the bracket 92 and is bent so that a portion 91 thereof extends transversely of the frame 14 through a guide bracket 94 mounted on the frame 14 on the same side of the vehicle as the wheel 16. The portion 91 terminates in a vertically extending portion 96 disposed in an opening 98 in a bracket 100 carried by the frame 14 on the opposite side of the vehicle. During up and down movement of wheel 16, the torsion bar 90 is twisted and its resistance to twisting provides the necessary resistance to wheel movement. The torsion bar 90 also performs the essential function of guiding the up and down movement of the shaft housing 22 and confines the movement of the shaft housing 22, during up and down movement of the wheel 16, to an arc having its center at the portion 91 of the bar which extends transversely of the vehicle.

An anti-sway bar 102 which provides a continuous connection between the wheels 16 may be provided in place of the torsion bar 90 (FIG. 5). The bar 102 is secured at its ends to brackets 104, like the brackets 92, mounted on the shaft housings 22 for the wheels 16 on transversely opposite sides of the vehicle. The anti-sway bar 102 thus performs the essential function of guiding the up and down movement of the wheel 16 and, in addition, provides for concurrent movement of the wheels 16. In other words, if a road irregularity causes upward movement of one of the wheels 16, this upward movement is partially transmitted by the anti-sway bar 102 to the other wheel 16 to thereby tend to return the frame 14 to a level position and reduce sway of the vehicle body.

As shown in FIG. 3, a line 101 which extends axially of the cylinder assembly 82 intersects the axis of the ball 56 and the center 103 of the universal joint 46 which is also the center of the ball and socket joint 26. Since the knuckle 36 is at all times in the same position relative to the line 101, and the position of the wheel 16 is fixed with respect to the knuckle 36, the position of the line 101 determines the position of the wheel 16. It is desirable during up and down movement of a wheel 16 when the vehicle moves over rough terrain, to have the wheel 16 maintain a substantially vertical position since movement of the wheel about a horizontal axis perpendicular to the wheel axis results in scuffing of the tire. For example, if the wheel 16 moves up and down about the joint 24 it will move through a substantial angle. The inclusion of the cylinder assembly 82, which functions as a combination kingpin and shock absorber assembly, in the wheel suspension mechanism 20 provides for only slight angular movement of the wheel 16 during up and down travel.

For example, if the wheel 16 moves downwardly a distance such that the point 103 is moved to the point 105, the housing 22 has been moved through the angle A but the wheel 16 has only been moved through the angle B. When the wheel 16 is moved upwardly to move the point 103 to the point 106, the housing 22 is moved through the angle C but the wheel 16 is only moved through the angle D.

Although the invention has been described with respect to a preferred embodiment thereof, it is to be understood that it is not to be so limited, since changes can be made therein which are within the scope of the invention as defined by the appended claims.

What is claimed is:

1. In a self-propelled steerable vehicle having a main frame and a plurality of ground wheels, an independent suspension mechanism for at least one of said wheels to be steered comprising a shaft housing extending transversely of the vehicle and pivotally supported at its inner end on the main frame for up and down swinging movement and operatively associated with said one of said wheels for determining its up and down swinging movement, a spindle rotatably supporting said wheel and connected to the outer end of said housing for universal movement relative thereto, a knuckle connected to said spindle, a plate secured by means including a ball and socket joint to said frame at a position above said knuckle, telescoping means connected to and extending between said knuckle and said plate, compression spring means extending between said knuckle and said plate and positioned about said telescoping means, a stabilizer member mounted on said frame and connected to said housing for preventing substantial swinging of said housing fore and aft of the vehicle, and a drive shaft for said wheel disposed in said housing.

2. In a self-propelled steerable vehicle having a main frame and a plurality of ground wheels, an independent suspension mechanism for at least one of said wheels to be steered comprising a shaft housing extending transversely of the vehicle and pivotally supported at its inner end on the main frame for up and down swinging movement, a spindle rotatably supporting said wheel and connected to the outer end of said housing for universal movement relative thereto, a knuckle connected to said spindle, a plate secured by means including a ball and socket joint to said frame at a position above said knuckle, telescoping means connected to and extending between said knuckle and said plate, compression spring means extending between said knuckle and said plate, a torsion bar secured at one end to said housing and extending from said one end first longitudinally and then transversely of the vehicle and attached adjacent its opposite end to said main frame for resisting up and down wheel movement and preventing substantial swinging of said housing fore and aft of the vehicle, and a drive shaft for said wheel disposed in said housing.

3. In a self-propelled vehicle having a main frame and a plurality of ground wheels for supporting said frame, mechanism for mounting one of said wheels on said frame comprising a drive shaft extending transversely of said frame and drivingly connected to said wheel, a housing for said drive shaft pivotally supported at its inner end on said frame for up and down movement and operatively associated with said one of said wheels for determining its up and down swinging movement, a spindle rotatably supporting said wheel, a ball and socket joint connecting said spindle to said housing, means including a universal joint disposed at the center of said ball and socket joint for transmitting rotary motion from said drive shaft to said wheel, combination kingpin and shock absorber means connected at the lower end thereof to said ball and socket joint and said spindle, said means including inner and outer telescoping tubular members the inner one of which constitutes a plunger and is guidably supported in the outer member and a spring member positioned about said telescoping members and operatively associated with said members so as to yieldably resist movement of the inner member in a direction into the outer member, and ball joint means connecting the upper end of said combination kingpin and shock absorber means to said frame so that the axis of said combination kingpin and shock absorber means intersects said ball joint and said universal joint.

4. In a self-propelled steerable vehicle having a main frame and a plurality of ground wheels, an independent suspension mechanism for at least one of said wheels to be steered comprising a shaft housing extending transversely of the vehicle and pivotally supported at its inner end on the main frame for up and down swinging movement and operatively associated with said one of said wheels for determining its up and down swinging movement, a spindle rotatably supporting said wheel and connected to the outer end of said housing for universal movement relative thereto, a knuckle connected to said spindle, a plate secured by means including a ball and socket joint to said frame at a position above said knuckle, a plunger and cylinder assembly connected to and extending between said plate and said knuckle, said assembly comprising a tubular plunger having a head provided with a restricted opening and a fluid containing cylinder telescoped about said plunger and guidably supported thereon, a compression spring positioned about said plunger and cylinder assembly and extending between said knuckle and said plate, a stabilizer member mounted on said frame and connected to said housing for preventing substantial swinging of said housing fore and aft of the vehicle, and a drive shaft for said wheel disposed in said housing.

5. In a self-propelled steerable vehicle having a main frame and a plurality of ground wheels, an independent suspension mechanism for a transversely opposite pair of said wheels comprising separate drive shaft means for said wheels, a shaft housing extending transversely of the vehicle and pivotally supported at its inner end on the main frame for up and down swinging movement for each of said wheels, a spindle rotatably supporting each of said wheels and connected to the outer end of the corresponding housing for universal movement relative thereto, a knuckle connected to each spindle, combination spring and spring dampener means connected to and extending between each said knuckle and said frame at a position above said knuckle, and an anti-sway bar connected at its ends to said housings adjacent said wheels and having end portions extending longitudinally of the vehicle and an intermediate portion extending transversely of the vehicle.

6. In a self-propelled steerable vehicle having a main frame and a plurality of ground wheels, an independent suspension mechanism for a transversely opposite pair of said wheels comprising a separate drive shaft means for said wheels, a shaft housing extending transversely of the vehicle and pivotally supported at its inner end on the main frame for up and down swinging movement for each of said wheels, a spindle rotatably supporting each of said wheels and connected to the outer end of the corresponding housing for universal movement relative thereto, a knuckle connected to each spindle, combination spring and spring dampener means connected to and extending between each said knuckle and said frame at a position above said knuckle, and a torsion bar for each of said wheels connected at one end to the shaft housing for that wheel and fixed at the opposite end to said main frame for resisting up and down wheel movement and for preventing substantial fore and aft swinging of said shaft housing with which it is individual, each said bar having a first portion extending transversely of the main frame and a second portion extending longitudinally of the main frame.

7. In a self-propelled steerable vehicle having a main frame ad a plurality of ground wheels, an independent suspension mechanism for each of a pair of wheels disposed on opposite sides of the vehicle comprising a first control arm extending transversely of the vehicle with its outer end secured to one of said pair of wheels and being pivotally supported at its inner end on the main frame for up-and-down swinging movement, a second control arm extending transversely of the vehicle with its outer end secured to the other of said pair of wheels and being pivotally supported at its inner end on the main frame for up-and-down swinging movement, and a first torsion bar having a longitudinally extending portion having a free end secured to said first control arm at a point located outwardly from said pivotally supported inner end of said first control arm and having a transversely extending portion terminating in a vertically extending portion immovably secured to said main frame whereby said first torsion bar resists up-and-down movement and prevents substantial fore-and-aft motion of said one of said wheels, and a second torsion bar having a longitudinally extending portion having a free end secured to said second control arm at a point located outwardly from said pivotally supported inner end of said second control arm and having a transversely extending portion terminating in a vertically extending portion with said vertically extending portion immovably secured to said main frame whereby said second torsion bar resists up-and-down movement and prevents substantial fore-and-aft motion of said other of said wheels.

References Cited in the file of this patent

UNITED STATES PATENTS

| 1,711,881 | Fornaca | May 7, 1929 |
| 2,164,838 | Porsche | July 4, 1939 |
| 2,212,453 | Perkins | Aug. 20, 1940 |
| 2,220,254 | Maier | Nov. 5, 1940 |
| 2,245,809 | Olley | June 17, 1941 |
| 2,254,325 | Slack | Sept. 2, 1941 |
| 2,624,592 | MacPherson | Jan. 6, 1953 |
| 2,637,592 | Karlby | May 5, 1953 |
| 2,660,449 | MacPherson | Nov. 24, 1953 |
| 2,730,375 | Reimspiess et al. | Jan. 10, 1956 |

FOREIGN PATENTS

| 749,374 | Germany | Sept. 13, 1944 |